United States Patent
Chen (10) Patent No.: US 10,579,987 B2
(45) Date of Patent: Mar. 3, 2020

(54) METHOD FOR AUTHENTICATING TRANSACTIONS

(71) Applicant: GEMALTO SA, Meudon (FR)

(72) Inventor: Yuexi Chen, Meudon (FR)

(73) Assignee: Thales Dis France SA, Meudon (FR)

( * ) Notice: Subject to any disclaimer, the term of this patent is extended or adjusted under 35 U.S.C. 154(b) by 656 days.

(21) Appl. No.: 14/915,413

(22) PCT Filed: Sep. 1, 2014

(86) PCT No.: PCT/EP2014/068506
§ 371 (c)(1),
(2) Date: Feb. 29, 2016

(87) PCT Pub. No.: WO2015/028664
PCT Pub. Date: Mar. 5, 2015

(65) Prior Publication Data
US 2016/0203468 A1   Jul. 14, 2016

(30) Foreign Application Priority Data
Aug. 30, 2013   (EP) .................................... 13306187

(51) Int. Cl.
*G06Q 20/32* (2012.01)
*G06Q 20/40* (2012.01)

(52) U.S. Cl.
CPC ....... *G06Q 20/3274* (2013.01); *G06Q 20/401* (2013.01); *G06Q 2220/00* (2013.01)

(58) Field of Classification Search
None
See application file for complete search history.

(56) References Cited

U.S. PATENT DOCUMENTS

| 6,390,375 B2* | 5/2002 | Kayanakis | G06K 19/02 235/492 |
| 7,768,379 B2* | 8/2010 | Bonalle | G06Q 10/025 235/383 |

(Continued)

FOREIGN PATENT DOCUMENTS

| EP | 1758053 A1 | 2/2007 |
| JP | 2002163583 A | 6/2002 |
| JP | 2010257101 A | 11/2010 |
| WO | WO2009146106 A1 | 12/2009 |
| WO | WO2011141062 A1 | 11/2011 |

OTHER PUBLICATIONS

Jerry Gao et al (A 2D Barcode-Based Mobile Payment System), 2009 (Year: 2009).*

(Continued)

*Primary Examiner* — Mamon Obeid
(74) *Attorney, Agent, or Firm* — The Jansson Firm; Pehr B. Jansson (57) ABSTRACT

The present invention generally relates to systems and methods for authenticating transactions through a simplex communication. To allow trusting the transaction with a payment by an image code such QR code, the invention proposes means to authenticate said transaction. For that, when the mobile payment application is loaded into preferably a secure element of the user mobile device a registration process is enabled. During this registration process on a server, an account of the user is created and a set of unpredictable numbers in quantity N is generated. This set of unpredictable numbers is transmitted to the mobile payment application for storage. The payment application uses the stored set of transaction unpredictable numbers for next N times transactions performed by the mobile payment application for transaction cryptogram calculation. The same transaction unpredictable number is recovered in the server side during the transaction authorization process.

14 Claims, 3 Drawing Sheets

(56) References Cited

U.S. PATENT DOCUMENTS

| | | | | |
|---|---|---|---|---|
| 7,793,845 | B2* | 9/2010 | Bonalle | G06Q 20/105 235/487 |
| 8,037,193 | B2* | 10/2011 | Hay | G06Q 20/367 705/65 |
| 8,255,323 | B1* | 8/2012 | Casey | G06Q 20/3221 705/35 |
| 8,429,048 | B2* | 4/2013 | Singh | G06Q 20/20 705/35 |
| 8,447,983 | B1* | 5/2013 | Beck | H04L 9/0894 705/65 |
| 8,726,247 | B2* | 5/2014 | Wilkinson | G06F 8/443 717/139 |
| 8,869,248 | B2* | 10/2014 | Moosavi | H04L 9/3228 726/5 |
| 8,893,227 | B2* | 11/2014 | Lu | H04L 63/0407 726/2 |
| 9,082,119 | B2* | 7/2015 | Ortiz | G06Q 20/3278 |
| 9,177,313 | B1* | 11/2015 | Silverman | G06Q 40/00 |
| 9,292,870 | B2* | 3/2016 | Langley | G06Q 30/0601 |
| 9,521,548 | B2* | 12/2016 | Fosmark | H04L 63/0823 |
| 9,721,248 | B2* | 8/2017 | Bondesen | G06Q 20/3821 |
| 9,898,781 | B1* | 2/2018 | Silverman | G06Q 40/00 |
| 2001/0002035 | A1* | 5/2001 | Kayanakis | G06K 19/02 235/492 |
| 2002/0126780 | A1* | 9/2002 | Oshima | G06Q 20/045 375/347 |
| 2003/0028481 | A1* | 2/2003 | Flitcroft | G06Q 20/00 705/39 |
| 2003/0182242 | A1* | 9/2003 | Scott | G06Q 20/12 705/65 |
| 2005/0127167 | A1* | 6/2005 | Nakajima | G06Q 20/02 235/380 |
| 2005/0192896 | A1* | 9/2005 | Hutchison | G06Q 20/10 705/40 |
| 2005/0256822 | A1* | 11/2005 | Hollingsworth | G06F 16/2308 |
| 2006/0105741 | A1* | 5/2006 | Suh | H04L 63/0471 455/410 |
| 2006/0234679 | A1* | 10/2006 | Matsumoto | H04M 3/382 455/411 |
| 2007/0022058 | A1* | 1/2007 | Labrou | G06Q 20/32 705/67 |
| 2007/0244811 | A1 | 10/2007 | Tumminaro | |
| 2007/0291741 | A1* | 12/2007 | Hwang | G06Q 20/3821 705/318 |
| 2008/0222711 | A1* | 9/2008 | Michaelis | G07C 9/00039 726/7 |
| 2009/0106138 | A1* | 4/2009 | Smith | G06Q 20/385 705/35 |
| 2009/0192940 | A1* | 7/2009 | Mann, III | G06Q 20/04 705/44 |
| 2009/0249475 | A1* | 10/2009 | Ohaka | G06F 21/34 726/16 |
| 2009/0254440 | A1* | 10/2009 | Pharris | G06Q 20/102 705/17 |
| 2009/0258631 | A1* | 10/2009 | Forsberg | H04L 63/08 455/411 |
| 2009/0276347 | A1* | 11/2009 | Kargman | G06Q 20/32 705/35 |
| 2010/0088237 | A1* | 4/2010 | Wankmueller | G06Q 20/12 705/75 |
| 2011/0209064 | A1* | 8/2011 | Jorgensen | G06F 9/54 715/733 |
| 2012/0028609 | A1* | 2/2012 | Hruska | G06Q 20/3674 455/411 |
| 2012/0030466 | A1* | 2/2012 | Yamaguchi | H04L 9/0841 713/168 |
| 2012/0089509 | A1* | 4/2012 | Kasriel | G06Q 20/102 705/40 |
| 2012/0130794 | A1* | 5/2012 | Strieder | G06Q 30/02 705/14.27 |
| 2012/0150669 | A1* | 6/2012 | Langley | G06Q 30/0601 705/16 |
| 2012/0171997 | A1* | 7/2012 | Knapp | G06F 21/35 455/411 |
| 2013/0048714 | A1* | 2/2013 | Sharma | G06Q 20/346 235/379 |
| 2013/0073309 | A1* | 3/2013 | Ritchie | G06Q 20/02 705/2 |
| 2013/0078978 | A1* | 3/2013 | Booth | H04W 8/20 455/418 |
| 2013/0151359 | A1* | 6/2013 | Fujisawa | G06Q 20/204 705/17 |
| 2013/0166410 | A1* | 6/2013 | Lee | G06Q 30/06 705/26.41 |
| 2013/0282582 | A1* | 10/2013 | Pereira | G06Q 20/12 705/44 |
| 2013/0308778 | A1* | 11/2013 | Fosmark | H04L 63/0823 380/270 |
| 2013/0311375 | A1* | 11/2013 | Priebatsch | G06Q 30/06 705/44 |
| 2013/0311382 | A1* | 11/2013 | Fosmark | G06Q 20/02 705/71 |
| 2013/0346222 | A1* | 12/2013 | Ran | G06Q 20/20 705/17 |
| 2014/0032415 | A1* | 1/2014 | Lee | G06Q 20/20 705/44 |
| 2014/0081784 | A1* | 3/2014 | Ahn | G06Q 20/42 705/21 |
| 2014/0100973 | A1* | 4/2014 | Brown | G06Q 20/34 705/17 |
| 2014/0108263 | A1* | 4/2014 | Ortiz | G06Q 20/3278 705/71 |
| 2014/0164254 | A1* | 6/2014 | Dimmick | G06Q 20/4012 705/71 |
| 2014/0229388 | A1* | 8/2014 | Pereira | G06Q 20/38215 705/76 |
| 2014/0230020 | A1* | 8/2014 | Mogaki | H04L 63/10 726/4 |
| 2014/0344157 | A1 | 11/2014 | Suitner | |
| 2015/0066778 | A1* | 3/2015 | Jang | G06Q 20/3829 705/71 |
| 2015/0235212 | A1* | 8/2015 | Ortiz | G06Q 20/3278 705/44 |
| 2015/0254650 | A1* | 9/2015 | Bondesen | G06Q 20/3674 705/67 |
| 2015/0319158 | A1* | 11/2015 | Kumnick | H04L 67/02 726/9 |
| 2016/0019536 | A1* | 1/2016 | Ortiz | G06Q 20/3221 705/67 |
| 2016/0098693 | A1* | 4/2016 | Shauh | G06Q 20/12 705/26.1 |
| 2016/0171207 | A1* | 6/2016 | Chen | G06F 8/65 726/2 |
| 2016/0203468 | A1* | 7/2016 | Chen | G06Q 20/3274 705/75 |
| 2017/0099393 | A1* | 4/2017 | Chvatal | H04M 15/8038 |
| 2017/0109726 | A1* | 4/2017 | Chen | G06Q 20/3227 |
| 2017/0161735 | A1* | 6/2017 | Ortiz | G06Q 20/3278 |
| 2017/0169422 | A1* | 6/2017 | Ye | G09C 1/00 |
| 2017/0249622 | A1* | 8/2017 | Ortiz | G06Q 20/3221 |
| 2017/0337550 | A1* | 11/2017 | Aparicio Ruiz | G06Q 20/385 |
| 2018/0069936 | A1* | 3/2018 | Kumnick | H04L 67/02 |
| 2018/0088924 | A1* | 3/2018 | Pirzadeh | G06F 8/65 |
| 2018/0091498 | A1* | 3/2018 | Kekicheff | H04L 63/0823 |
| 2018/0146374 | A1* | 5/2018 | Golan | H04W 12/06 |
| 2018/0376333 | A1* | 12/2018 | Chen | H04W 12/06 |
| 2019/0043022 | A1* | 2/2019 | Fosmark | G06Q 20/02 |

OTHER PUBLICATIONS

PCT/EP2014/068506, International Search Report, dated Oct. 8, 2014, European Patent Office, P.B. 5818 Patentlaan 2 NL-2280 HV Rijswijk.

(56) References Cited

OTHER PUBLICATIONS

PCT/EP2014/068506, Written Opinion of the International Searching Authority, dated Oct. 8, 2014, European Patent Office, D-80298 Munich.

* cited by examiner

METHOD FOR AUTHENTICATING TRANSACTIONS

TECHNICAL FIELD

The invention relates to systems and methods for authenticating transactions through a simplex communication which occurs in one direction only. More particularly, the invention relates to systems and methods of authenticating transactions taking place at a point-of-sale/service ("POS") terminal which are paid with an image payment code.

More particularly, the invention relates to systems and methods for payment with a QR code displayed on a mobile device payment at a merchant terminal.

BACKGROUND ART

Well known payment cards are used by millions of people worldwide to facilitate various types of commercial transactions. In a typical transaction involving the purchase of a product or service at a merchant location, the payment card is presented at a point of sale terminal ("POS terminal") located at a merchant's place of business. The POS terminal may be a card reader or similar device that is capable of accessing data stored on the payment card, where this data includes identification and authentication data. Data read from the payment card is provided to the merchant's transaction processing system and then to the acquirer, which is typically a bank or other institution that manages the merchant's account.

To ensure the security and global interoperability of chip based payment cards, it is well known EMV standards which define the interaction between EMV-compliant payment cards and EMV-compliant POS terminals. Therefore to accept EMV payments, merchants have to deploy EMV-compliant POS terminals which support dual direction communication protocols. Such EMV-compliant POS terminals hardware, their deployment and their maintenance are considerable costs for the merchants.

Although this existing payment instruments function well, mainly due to the fact that the card associations have been protecting the consumers by passing on losses to merchants and banks, it is clear that banks, merchants and consumers desire a simple, secure method to conduct financial transactions.

Today, technology has revolutionized the way that consumers make purchases and expanded the range of retail channels. Indeed, mobile devices, such as mobile phones, play an increasingly versatile role in daily life. Many new features and services are being developed in an attempt to expand mobile phones beyond their traditional role of voice and message transmission.

Mechanisms for users to perform transactions are evolving with today's technology. Such mechanisms include blue tooth communication, Near Field Communication (NFC), Quick Response (QR) code scanning, WiFi communication, and the like.

In the case where the payment experience is automated by a facility with Near Field Communication (NFC), the facility must have a NFC-compatible payment terminal, which is inconvenient for the facility because of the hardware, software, and support expense associated with having NFC-enabled devices on site. Moreover, in order for the customer to use the NFC mechanism, the customer's smart phone has to have stored sensitive information on the customer's smart phone, such as: credit card numbers, loyalty numbers and so forth. Even the best software is still subject to potential hacking and compromise if the smart phone is acquired or if a remote connection can be made to the smart phone.

In the case of a transaction that uses QR (Quick Response) codes or bar codes that give customers an easier way to pay, information fluxes between three parties of the transaction: the seller (with his POS), the buyer (with his mobile phone), and a server of the payment system (bank or similar). The seller, when he has to carry out a transaction for selling one or more products, requires a bar code or a Quick Response (QR) code to the POS. The bar code or the QR code is displayed or printed and provided to the buyer, who captures it by a mobile device and sends, by SMS, Wifi, network, Internet . . . , to the server. The server verifies the identity of the buyer. Once such an identity is verified, the server sends to the seller a notification of effected payment, with which the seller can close the sale and deliver the goods and purchase receipt.

This method has the drawback that it needs the use of the POS and occupies the server with many information exchanges, what can be critical in some periods in the year because of the enormous amount of required transactions.

In the case of an online transaction, a majority of e-commerce and m-commerce sites on the internet use ad hoc payment methods. For example, if a person wants to purchase coffee online, that person has to register and create an account with an online coffee merchant by entering his personal and financial information on websites. Further, this account creation process must be repeated with other vendors for other purchases. This process is inconvenient to all parties involved. The merchant must maintain a dedicated account management and payment system. The customer must establish separate accounts with numerous merchants, in addition to remembering the username and password information for each merchant's website. With this payment system, when the consumer is ready to pay, the POS terminal/system can print or display a two-dimensional (2D) barcode or Quick Response (QR) code along with the transaction details. The merchant provides this to the consumer, who scans the code with his/her mobile device. The scanned imaged code is linked with the consumer's mobile phone, which can then be directed for payment of the transaction, to the user account via the mobile device.

This payment system has the drawback that it needs the use of connection data between the user account and the mobile device during the payment, what can be critical when the connection data is unavailable during the payment.

One problem with the variety of existing mechanisms used to interact with customers is that often the customers are required to establish a connection before a transaction can concluded. This poses a security risk that some consumers do not want to engage in and it also slows down the transaction.

Moreover, QR code payment is not compliant with EMV transaction protocols because it is not a duplex communication. Therefore, it's not possible to do a kind of EMV transaction which allows authenticating the transactions by using only one QR code.

As the mobile computing capabilities and development of robust wireless network infrastructure merge, it is clear that there is an increasing desire for faster, cheaper, secure and more convenient image code payment systems to conduct financial transactions which can be compliant with standard protocols such as EMV standard.

As a result, there is a great need for conducting financial transactions between individuals without having to depend on the mobile data connection or support duplex communication like NFC while be able to authenticate the transaction.

SUMMARY OF THE INVENTION

The present invention addresses the aforementioned security drawbacks of the authentication of a transaction in a one way communication—vs. traditional and secured dual communication (EMV transactions).

The present invention relates to a system and method for authenticating a transaction between a mobile payment application in a mobile device and a merchant, over a one way communication. It is further assumed that these transactions are routed to the issuer of the mobile payment application, through a secure channel and protocol that is outside of scope of the present invention.

The techniques herein provide mechanisms that enable a consumer (customer or user) to pay for his/her transaction without requiring: a mobile Point-Of-Sale (POS) terminal, a credit/debit card to be surrendered or a Near Field Communication (NFC) tap. Instead, an image payment code is used to pay the transaction. Today, image payment code such as QR code payment or barcode payment is more and more popular in the domain of mobile payment, because it doesn't require additional hardware other than common personal accessories already owned by the majority of the population, such as smart phones, tablets or similar devices with camera interfaces. The payment is completed when a merchant image scanner reads the image payment code displayed on the user mobile device.

This kind of payment doesn't require additional hardware which supports duplex communication protocol; it just needs a display, which is usually the consumer's mobile phone screen, to display the OR code, and a OR code scanner, which can be QR code scanner of cash register or a camera of merchant's mobile phone, to scan the QR code which is displayed on the consumer's mobile phone screen.

To accept QR code payment, acquirer only needs to integrate a piece of software in the merchant's cash register or mobile phone, the cost are nearly zero.

To allow trusting the transaction with a payment by an image code, the present invention proposes means to authenticate said transaction. For that, when the mobile payment application is downloaded into preferably a secure element of the user mobile device, a registration process is enabled. During this registration process with the server, an account of the user is created and a set of transaction unpredictable numbers in quantity N is generated. This set of unpredictable numbers is transmit securely to the mobile payment application and stored securely inside the secure element. The payment application uses the stored N transaction unpredictable numbers for next N times transactions performed by the mobile payment application sequentially. The same set of unpredictable numbers is stored in the server database, and used by server for next N times transaction authentication sequentially. The generated transaction unpredictable number is used strictly once for a transaction.

With sequence reference, the server is able to authenticate the transaction using standard transaction authentication algorithm, which involves transaction unpredictable number and keys shared between payment application and server. The standard transaction algorithm may be EMV transaction process, Mifare transaction process, or Calypso transaction process. Those standards are well known by the person in the art and do not need to be described anymore herein.

The embodiments described in this specification are directed towards the EMV transaction process by knowing that it can be any suitable transaction standard. During a payment process, the merchant displays the amount to pay in the checkout terminal. The consumer launches the mobile payment application on his/her mobile device. The cardholder inputs the transaction amount on his/her mobile device. The mobile payment application picks the first unused transaction unpredictable number and elaborates a standard EMV authorization request. This authorization request comprises transaction amount input by the consumer, a transaction cryptogram generated using an EMV key, from a list of transaction data, which includes the transaction amount, transaction unpredictable number and other related financial data. Once the authorization request is generated, the currently used transaction unpredictable number is marked as used in the secure element. The mobile payment application generates an image payment code comprising the authorization request. Said image payment code can be a OR code. The merchant scans the OR code displayed on consumer's mobile device.

The merchant sends the authorization request decoded from scanned QR code to the server. The server checks the received authorization request. From the content of the received authorization request, the server recovers the corresponding transaction unpredictable number stored in its database. The recovered transaction unpredictable number is marked as used in the server's database. The transaction cryptogram of the authorization request is sent to the issuer bank with the recovered transaction unpredictable number. Issuer bank validates the authorization request using the standard EMV algorithm, which involves an EMV key and the same list of transaction data. The merchant is finally notified of the result, from the issuer bank, directly or via the server, of the authorization request.

The invention relies on a one-way transaction between the mobile device and the merchant. With the way proposed to authenticate the transaction it is not needed to perform a mutual authentication between the payment application and the issuer to authenticate the transaction.

Aspects of the embodiments of the present invention relate in general to a method for authenticating a transaction with an image code provided by a mobile payment application through a user mobile device wherein:
  generating a set of transaction unpredictable numbers for upcoming EMV transactions by a server,
  sending the generated set of transaction unpredictable numbers to the mobile payment application which resides in the secure element of consumer's mobile device,
  storing the received set of transaction unpredictable numbers inside the consumer's mobile device,
  storing the same set of transaction unpredictable numbers in the server's database,
  using the transaction unpredictable number stored in the secure element in sequence for generating EMV cryptogram of transaction authorization request,
  generating an image code from the transaction authorization request message,
  displaying the image code on user the mobile device display
  scanning the image code, decoding the authorization request message and sending decoded authorization request to the server,
  recovering the transaction unpredictable number from the server database, forwarding the authorization request to an issuer bank with recovered transaction unpredictable number for final approval of the transaction authorization request.

Aspects of the embodiments of the present invention relate in particular to a method for authenticating and authorizing a transaction involving a terminal provider of a product or a service and a mobile application of a user mobile device wherein:

during a registration process of the mobile application to a server:

operating the server to generates a set of transaction unpredictable numbers, operating the server to send said generated set of transaction unpredictable numbers to the mobile application, during the authentication and authorization of the transaction:

operating the mobile application to select a stored unused transaction unpredictable number, said selected unused transaction unpredictable number allowing to identify said transaction, operating the mobile application to elaborate a transaction authorization request message from the selected transaction unpredictable number, operating the mobile application to encode the authorization request into a simplex communication data, operating the terminal provider to receive and decode the simplex communication data, operating the terminal provider to send to the server, the decoded simplex communication data for authentication and authorization of the transaction, operating the server to verify a match of a transaction unpredictable number between the content of the decoded transaction authorization request message and the server transaction unpredictable number database, if the verification is successful, operating the server to add the matched transaction unpredictable number to the authorization request message, operating the server to send the transaction authorization request to an issuer, operating the server to receives from the issuer receiving the transaction authorization result indicating whether or not said transaction is authenticated and authorized, operating the server to forward the transaction authorization result to the terminal provider.

To achieve those and other advantages, and in accordance with the purpose of the invention as embodied and broadly described, the invention proposes a method for authenticating and authorizing a transaction involving a provider of a product or a service and a mobile application of a user mobile device wherein:

generating a set of transaction unpredictable numbers by a server, sending the said generated set of transaction unpredictable numbers to the mobile application, selecting an unused transaction unpredictable number stored in the mobile application to the identification of said transaction, elaborating a transaction authorization request message from the selected transaction unpredictable number, encoding the authorization request into a simplex communication data, receiving and decoding the simplex communication data and sending from the provider to the server the decoded simplex communication data for authentication and authorization of the transaction, recovering the transaction unpredictable number in the server adding the recovered transaction unpredictable number to the authorization request, sending the transaction authorization request to an issuer by the server, receiving the transaction authorization result from the issuer indicating whether or not said transaction is authenticated and authorized.

In other various methods, to receive the simplex communication data, a scanner terminal of the provider scans the encoded authorization request.

In other various methods, the simplex communication data is an image code such a QR code or a barcode, this image code being displayed on the user mobile device to be scanned by the provider and sent to the server. The simplex communication data can also be a modulated sound, a modulated vibration or a NFC tag message.

In other various methods, when the selected transaction unpredictable number is added to the elaborated transaction authorization request message then the server compares the received selected transaction unpredictable number to the recovered transaction unpredictable number. If the comparison is successful, the server adds the recovered transaction unpredictable number to the authorization request and sends it to the issuer.

In other various methods, the unused transaction unpredictable number is selected according to a pre-determined sequence. The transaction unpredictable number is recovered by the server according to a unique identifier of the user and the pre-determined sequence. In other various methods, the transaction unpredictable number can be recovered by the server from the unique identifier of the user, an index associated to the selected transaction unpredictable number which is added to the authorization request and the pre-determined sequence.

In other various methods, the unused transaction unpredictable number is selected randomly and wherein an index is associated to said selected transaction unpredictable number and wherein the transaction unpredictable number is recovered by the server from a unique identifier of the user and the index associated to the selected transaction unpredictable number.

In other various methods, the transaction unpredictable number is marked as used in the storage after the selection step and the recovery step. When the transaction unpredictable numbers stored in the mobile payment application are all marked as used then a new set of transaction unpredictable numbers is generated by the server and sent to the mobile application for storage.

In other various methods, the transmission of the generated set of transaction unpredictable numbers from the server to the mobile payment application is protected:

by applying an encryption algorithm which involves key(s) shared between the server and the mobile payment application, and/or by applying an integrity algorithm which involves key(s) shared between the server and the mobile payment application.

In other various methods, the mobile application and the set of transaction unpredictable numbers are stored into a secure element of the mobile device.

In other various methods, the transaction is a financial transaction which being conform to EMV transaction standard, Mifare transaction standard or Calypso transaction standard.

The method of the present invention has many technological advantages, among them:
no impact on existing EMV infrastructure,
high security level by using payment mobile application stored on the secure element,
no need to deploy NFC POS,
reduce the deploy and maintenance cost for payment network,
more and more merchants are already equipped with QR code scanner and QR code scanner cost much less than NFC POS,
no mobile data needed during payment and not rely on mobile data for payment,
quick payment process in consumer side,
consumer has more confidence as the transaction amount is input by himself/herself,
simplicity,
ergonomic design, and
full independence from the EMV infrastructure.

BRIEF DESCRIPTION OF THE DRAWINGS

The following detailed description will be better understood with the drawings, in which.

DETAILED DESCRIPTION OF THE EMBODIMENTS OF THE INVENTION

The present invention is not specific to any particular hardware or software implementation, and is at a conceptual level above specifics of implementation. It is to be understood that various other embodiments and variations of the invention may be produced without departing from the spirit or scope of the invention. The following is provided to assist in understanding the practical implementation of particular embodiments of the invention.

The same elements have been designated with the same referenced numerals in the different drawings. For clarity, only those elements and steps which are useful to the understanding of the present invention have been shown in the drawings and will be described.

Further, the mechanisms of data communication between the parties and their environment have not been detailed either, the present invention being here again compatible with usual mechanisms.

Furthermore, the connecting lines shown in the various figures contained herein are intended to represent exemplary functional relationships and/or physical couplings between the various elements. It should be noted that many alternatives or additional functional relationships or physical connections may be present in a practical system. Furthermore, the various entities in FIG. 1 may communicate via any suitable communication medium (including the Internet), using any suitable communication protocol.

Moreover, when an action is said to be performed by a terminal, it is in fact executed by a microprocessor in this terminal controlled by instruction codes recorded in a program memory on said terminal. An action is also ascribed to an application or software. This means that part of the instruction codes making up the application or software are executed by the microprocessor.

Figure 1:
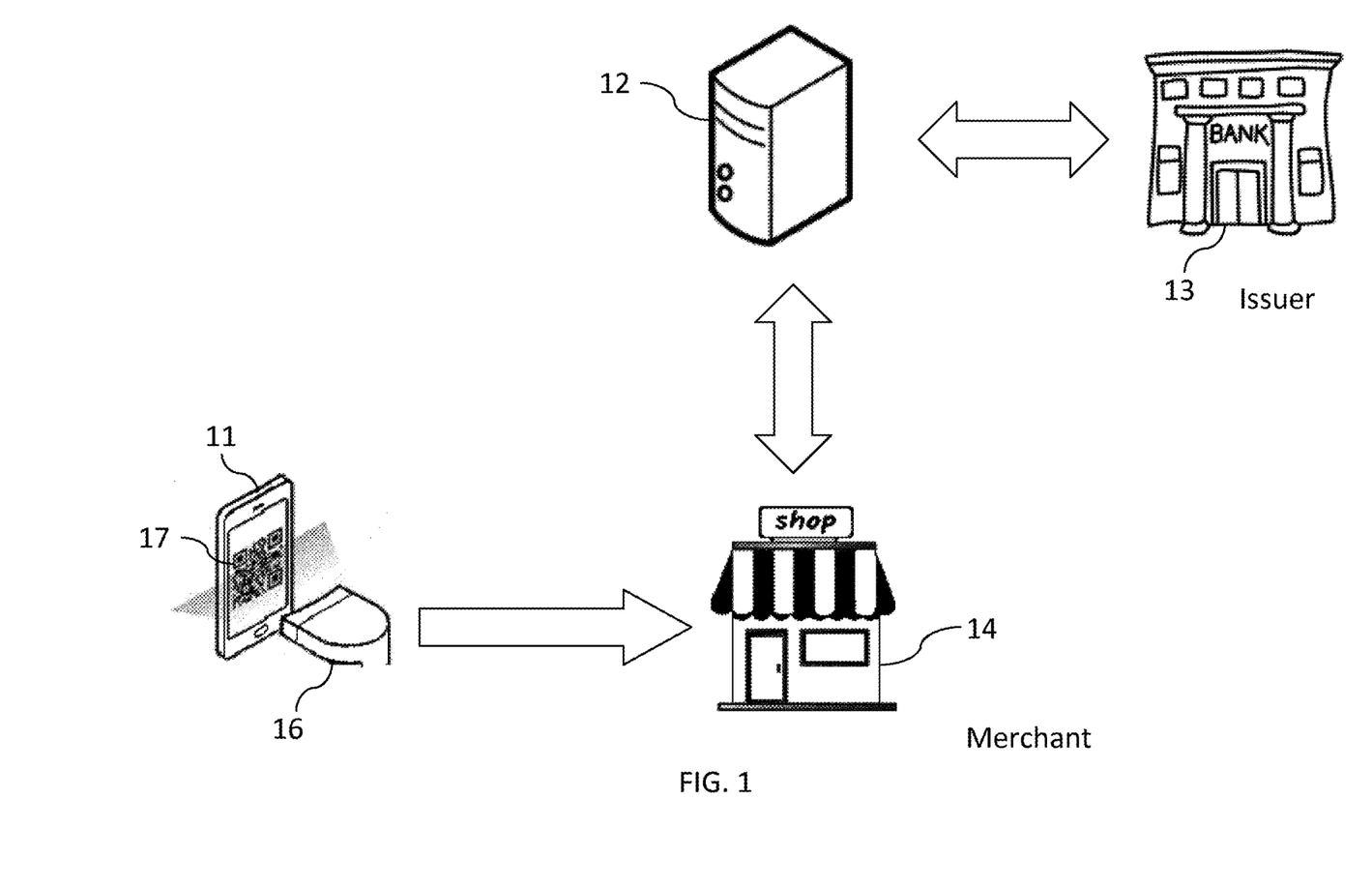
FIG. 1 illustrates the different entities involved in a transaction with an image payment code according an embodiment of the present invention.

FIG. 1 shows entities involved in a flow diagram for managing mobile payment application 10 on a mobile communication device 11. For simplicity of discussion, only one of each entity is shown at FIG. 1. It is understood, however, that embodiments of the technology may include more than one of each entity. Additionally, some embodiments of the technology may include fewer than all of the entities shown in FIG. 1. FIG. 1 depicts an example of the system in which a server processing environment 12 and an issuer 13 are implemented.

The mobile device 11 comprises a secure element 15. The secure element 15 inside the mobile device 11 is used to host and store data and applications that require a high degree of security. In a preferred embodiment, the payment application 10 is installed into the secure element 15. The secure element 15 is provided to the mobile device 11 by a secure element issuer. The secure element issuer may not necessarily be a member of the payment process or the same entity as the issuer 13 of the payment. For example, the secure element issuer may be a mobile network operator (MNO) or the manufacturer of the mobile device 11.

The mobile payment application 10 is software or an application providing payment capabilities which can be implemented within the secure element 15, which is inside the mobile device 11. The mobile payment application 10 provides the functionalities to manage user's payment information and generate transaction signature. During a payment transaction, the mobile payment application 10 transmits payment data to the server 12 through a merchant 14 in a simplex communication.

The mobile payment application 10 interfaces with a user interface software on mobile device 11 for user interaction (e.g., to enter and view information). The user interface software also communicates with the mobile payment application 10 to display payment transaction information for the merchant 14.

As used herein, the term "issuer" encompasses any entity that issues and maintains a financial account (e.g., credit, debit, or prepaid) and the mobile payment application 10 associated with the financial account. Alternatively, the issuer 13 may not issue the mobile payment application 10 directly and instead may contract with another party to issue the mobile payment application 10 such as the server 12. The issuer can be a bank.

The mobile payment application 10 is loaded into the secure element 15 inside the user mobile device 11. The mobile payment application 10 can be pre-loaded in the manufacture or personalization phase of secure element 15 before the secure element 15 is delivered to user. The mobile payment application 10 can also be downloaded by user in the post-issuance phase of secure element 15 via a communication network from the database of the issuer 13 or other entities.

The mobile device 11 may be in any suitable form for image payment device. For example, suitable mobile communication devices 11 can be hand-held and compact so that they can fit into a user's wallet and/or pocket (e.g., pocket-sized). The mobile device 11 typically comprises a processor, a memory, input device, output devices, and image code generator devices, all of which are operatively coupled to the processor. Specific examples of mobile communication devices 11 can include cellular or wireless phones, tablets, smartphones, personal digital assistances (PDAs), portable computers, and the like. Although a mobile communication device 11 is referred to in the present application, embodiments of the present invention could be implemented with a number of different mobile user devices capable of communicating with the entities described herein and generating image codes.

According to an embodiment, the image payment code can be a quick response (QR) code, any other type of code, or any combination of types of codes formed thereon or associated therewith.

The server processing environment 12 can be a server computer or a series of server computers that are configured to communicate with the merchant 14. The server 12 communicates with the issuer 13. The server 12 may be implemented by issuers, acquirers, third-party services providers, or trusted service managers. The server 12 can be used for facilitating the authentication of the transaction via the image payment code 17. For example, the server 12 can receive a communication from the merchant 14 that is indicative of the content of image payment code 17 and can facilitate a purchase transaction in response to the communication.

The merchant 14 may be implemented using, for example, one or more servers. Specifically, the merchant can be realized by a server and a database that are managed by a provider. The merchant 14 can be a merchant checkout terminal, a mobile device, a computer, and/or a server, for example. The merchant 14 can be used for making a purchase by the user with the image payment code. The merchant 14 comprises a scanner 16. The scanner 16 can be a OR code scanner, a barcode scanner, an SKU scanner, a camera controlled by image recognition software or any other type of image code scanner. The scanner 16 can be used to scan the image payment code 17.

Well known secure communication can be established between the merchant 14, the issuer 13 and the server 12. This secure communication can be established with a mutually-authenticated secure sockets layer (SSL) channel. This secure communication may use data encryption standards such as, e.g., RSA with a key of at least 1024 bits, triple data encryption standard (DES), 128-bit advanced encryption standard (AES), an RC4 stream encryption algorithm using minimum 128-bit key length, etc. These encryption standards may be used to create the secure session. Any other suitable form of secured communication between these entities may be implemented as one of ordinary skill would recognize.

Upon the mobile payment application 10 is loaded on the secure element 15 of the mobile device 11; the user can initiate a registration process and create a user account on the server 12.

Figure 2:
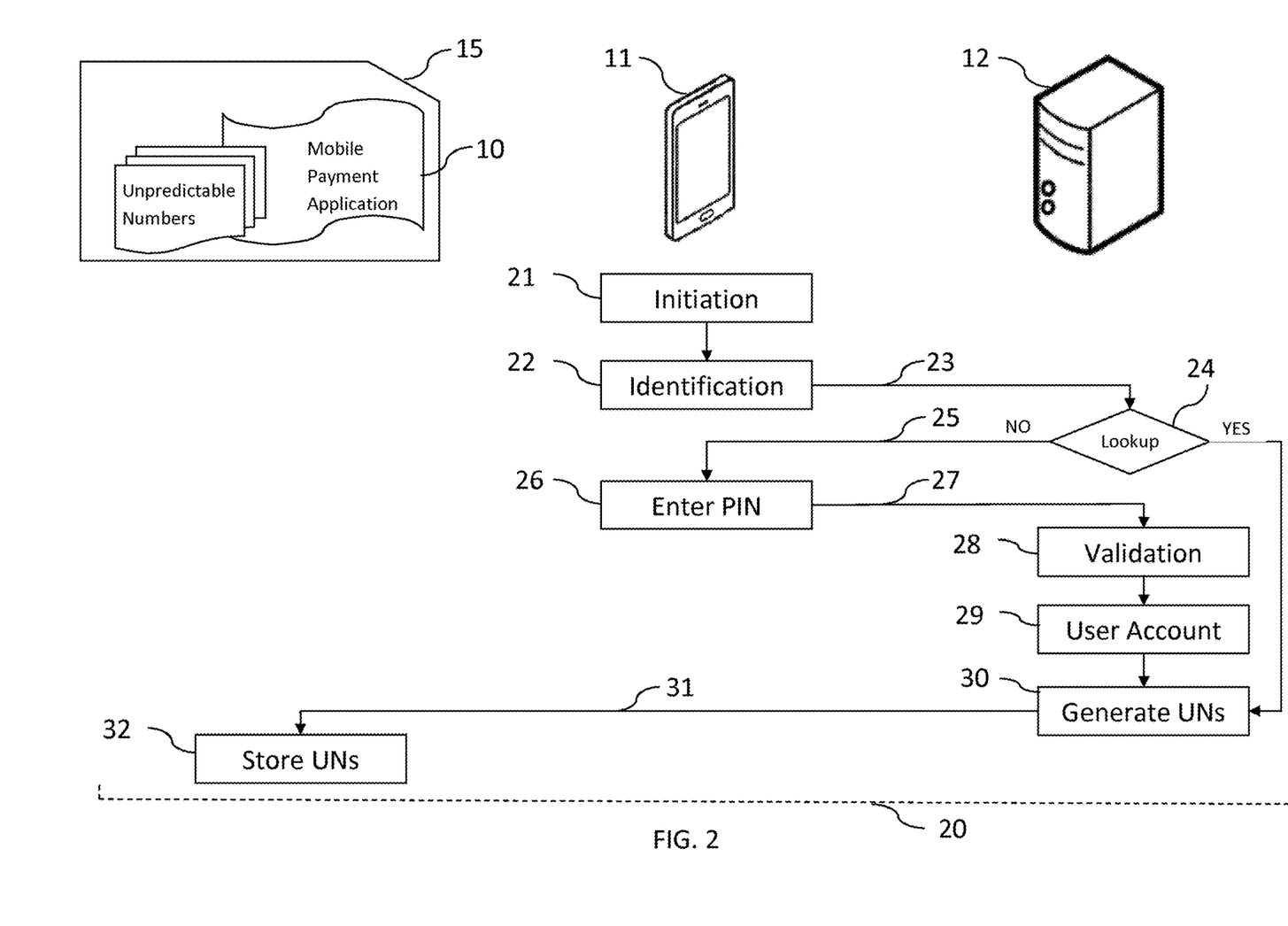
FIG. 2 is a logic flow diagram in accordance with an exemplary embodiment of this invention during a registration phase of a payment application.

FIG. 2 illustrates an exemplary flow diagram for registering the mobile payment application 10 on the server 12. Therein, the process flow between the secure element 15 and the server 12 is depicted with labeled arrows to which respective numbers are assigned. The flow is understood as being performed sequentially from top to bottom as indicated by the increasing numbers. However, it should be noted that there may be multiple instances of this protocol run in parallel without specified ordering.

FIG. 2 is a flow chart depicting a set of functions 20 that can be carried out in accordance with an example embodiment. The set of functions 20 can be performed to register user mobile payment application 10 on the server 12. The set of functions 20 are shown within steps 21 through 32. A description of these steps now follows.

At step 21, the mobile payment application 10 displays a registration icon (not shown) on the mobile device 11 in which the user can activate in order to initiate a registration process. The registration icon can comprise the text "REGISTER" or some other text or symbol.

At step 22, the mobile payment application 10 displays a free-form entry field on the user mobile device 11 in which the user is prompted to enter the user's identifier. This user's identifier can be a Mobile Subscriber Integrated Services Digital Network Number ('MSISDN', the user's mobile telephone number), a Primary Account Number ('PAN') of a payment account, or a National Identify Number. The user identifier can be also some other unique identifier of the user. In another embodiment, the user identifier can be also retrieved automatically from the mobile payment application 10, secure element 15, or user mobile device 11.

The mobile payment application 10 transmits, through the mobile device, the user's unique identifier to the server 12, at step 23. The server 12, at step 24, performs a lookup to check whether a user account associated with the user's unique identifier already exists in its database. If no such user account exists, the server 12 can respond to the user mobile device 11 with, for example, an SMS containing a one-time PIN code, at step 25. At step 26, the user can then enter the PIN code into a corresponding field displayed on user mobile device 11 by the mobile payment application 10. At step 27, the mobile device 11 returns the user-entered PIN code to the server 12, which validates the returned PIN, at step 28. If the PIN validation is successful the cloud 12, at step 29, creates a user account in its database and can notify the mobile payment application 10 that registration has been successful. For purposes of this description, the PIN code does not have to be entirely numeric, although it can be entirely numeric. A PIN code that is not entirely numeric can be an alpha-numeric PIN code.

In another embodiment, if the user account does not exist, at step 24, the cloud server 12 jumps to step 29 and creates a user account in its database without the request of a PIN enter.

In an embodiment, the mobile payment application 10 can create a user profile on the server 12 for that it prompts the user to enter user attributes such as the user's first name, the user's last name, date of birth, an e-mail address, a physical address, identification of the issuer 13, . . . . The mobile device passes the data to the server 12 which stores these particulars in the newly-created user account in its database.

When the account of the user is created, the server 12 generates, at step 30, a set of transaction unpredictable numbers in quantity N sequentially. These transaction unpredictable numbers can be conform to EMV transaction unpredictable number format and quality.

The server 12 generates a message which can comprise an encrypted data and a Message Authentication Code ('MAC') value. The encrypted data is the result of the encryption of the set of generated transaction unpredictable numbers with a session encryption key ENC shared with the secure element 15. The MAC value is the result of a MAC operation on at least one part over the content of the message. The MAC operation uses a session key MAC shared with the secure element 15 and a cryptographic checksum algorithm to produce the MAC value which later can be used to ensure the data has not been modified.

These session keys are used to protect the confidentiality and integrity of the messages exchanged between the mobile payment application 10 and the server 12.

At step 31, the server 12 can send to the secure element 15 the message comprising the encrypted data and the MAC value. The mobile payment application 10 computes a MAC value. The computed MAC value is compared to the received MAC value to check if the received message has been altered. In an embodiment, if the verification of the MAC value fails, the process flow can be closed and the mobile payment application may notify the server 12 that the MAC value is tampered. If the MAC value is successfully verified, the secure element 15 may decrypt the encrypted data with the shared session key ENC.

In embodiments, the set of transaction unpredictable numbers generated by the server 12, at step 30, can be sent to the mobile payment application 10 in clear without encryption and MAC, in clear with MAC, or in encrypted message without MAC.

The decrypted set of generated transaction unpredictable numbers is preferably stored in the memory of the secure element which is not accessible from the external.

Figure 3:
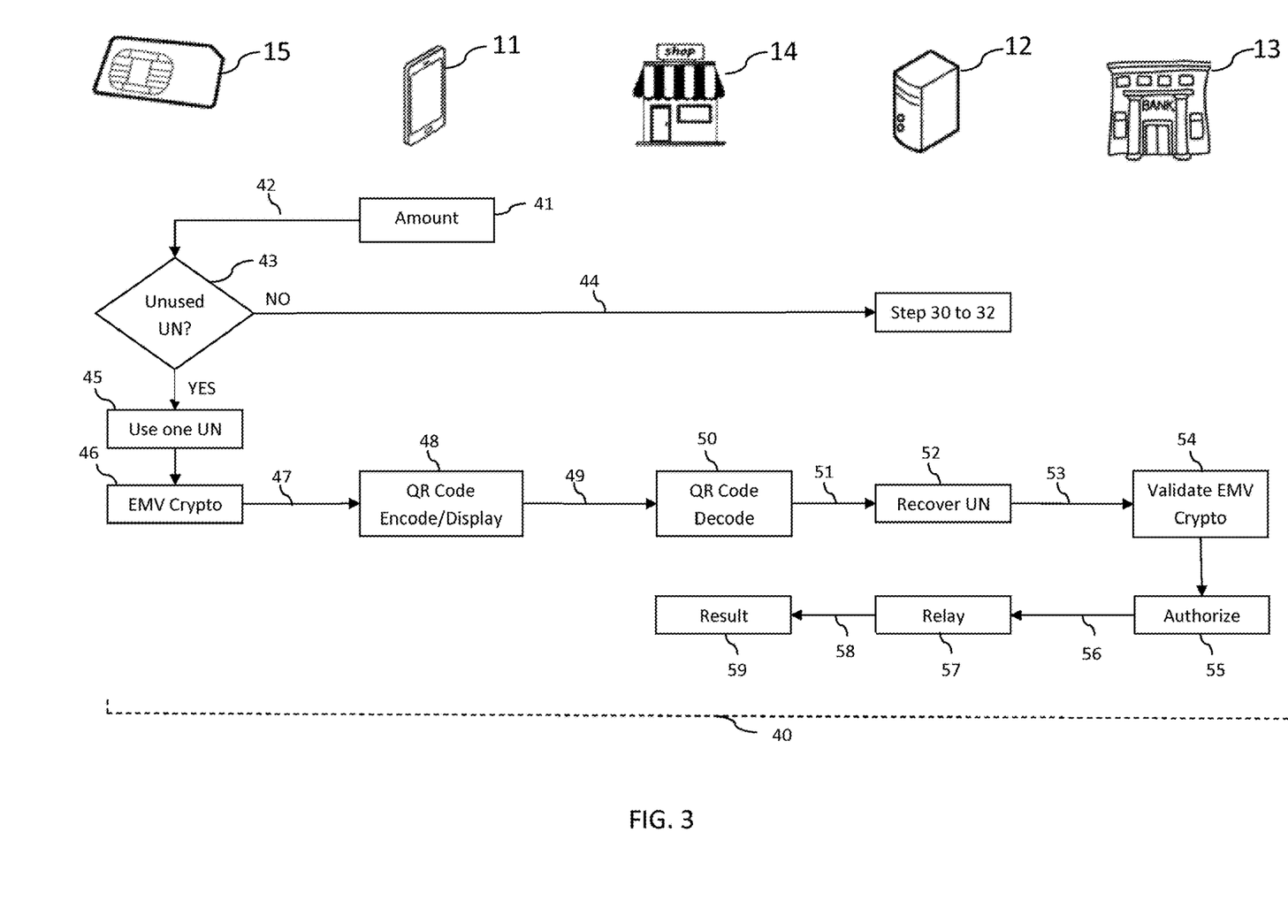
FIG. 3 is a transaction flow diagram in accordance with an exemplary embodiment of this invention.

FIG. 3 illustrates an exemplary transaction flow diagram 40 in an embodiment. During a purchase at a merchant place, the transaction flow is initiated with a users' action. Indeed, the transaction flow 40 is activated by the user via interaction with the mobile payment application 10 due, for example, to a click on the icon of said mobile payment application displayed on the mobile device 11.

At step 41, the user can then enter an amount of the purchase transaction into a corresponding field displayed on user mobile device. At step 42, the mobile device 11 sends the user-entered transaction amount to the mobile payment application 10 in the format which conforms to EMV standard.

When the amount is received, the mobile payment application 10 verifies whether unused transaction unpredictable number which was generated by server 12 in the previous steps from 30 to 32 is remaining, at step 43. If there is no unused transaction unpredictable number remaining in mobile payment application 10 on the secure element 15, then a command is sent, at step 44, to the server 12 to generate another set of transaction unpredictable numbers. Steps 30 to 32 of FIG. 2 are performed again, when the server 12 receives such command of generation. If there is unused transaction unpredictable number(s) remaining in the mobile payment application 10 on the secure element 15, the mobile payment application 10 picks one unused transaction unpredictable number. In an embodiment, unused transaction unpredictable number is picked according to a pre-determined sequence, at step 45. When used, said transaction unpredictable number is marked as picked.

In another embodiment, the mobile payment application 10 picks one unused transaction unpredictable number randomly instead of using a pre-determined sequence. In an embodiment, an index can be associated to the picked transaction unpredictable number. In this case the index is appended in the authorization request. In a preferred embodiment, at step 46, the mobile payment application performs an EMV transaction process.

At the end of this process, a response message conforms to EMV format is generated by the mobile payment application 10. This response message comprises a transaction cryptogram. This message is generated by using the transaction amount input by user in step 41 and transaction unpredictable number picked in step 45, involving various keys and data elements which are defined in EMV standard. In an embodiment, the response message is transmitted to user mobile device at step 47. User mobile device then encodes the response message into an image code format and displays the said encoded image code 17 on the mobile device, at step 48. In another embodiment, the mobile payment application 10 encodes the response message into an image code. The image code transmitted to user mobile device is displayed.

The image code can be a quick response (QR) code. The code can be a barcode, or any other image type of code. The code can be read or scanned via a mobile device. At step 49, the code is scanned by the merchant scanner 16 from the mobile device screen.

As used herein, the term "scan" can refer to any process for determining a code or other information, such as from the image code.

The scanned code is communicated to the merchant 14 via the scanner 16. The merchant 14 then decodes the scanned code, at step 50, to recover the information that it contains. The merchant can add to the response message the merchant identification code and a repository address.

The merchant 14, at step 51, transmits the response message to the server 12 for authenticating and authorizing the transaction.

At step 52, the server 12 first extracts the user identifier from the response message. From this extracted user identifier the server recovers the transaction unpredictable number used for this transaction from its database according to the pre-determined sequence way. The server 12 marks the recovered transaction unpredictable number as used in its database. The server 12 then builds an EMV authorization request comprising the transaction cryptogram of the response message and wherein the recovered transaction unpredictable number is added.

At step 53, the server 12 sends the authorization request to issuer 13. Issuer 13, at step 54, verifies the content of the authorization request according to procedures defined in EMV standard, by using the amount input by user at step 41 and transaction unpredictable number recovered by server 12 at step 52, along with other data elements extracted from authorization request, involving various keys and data elements that are defined in EMV standard.

Issuer 13 builds a response to the received authorization request according to the user's financial data, at step 55, when the verification at step 54 is successful. This response can be a transaction result code, accepting or declining the transaction, an authorization response cryptogram . . . .

At step 56, issuer 13 sends the response to the server 12. The server 12, at step 57, receives the response of the transaction. The server 12 forwards to the merchant 14 the transaction result code extracted from the response, at step 58. The merchant 14 receives the transaction authorization result, at step 59.

The invention is simple and easy to implement, and does not require additional hardware at the merchant side. By applying the EMV crypto, fraud and theft due to misappropriation of the image code can be eliminated. By buffering the a set of transaction unpredictable numbers inside the mobile payment application 10 on secure element 15, the requirement of duplex communication for EMV transaction is removed.

In another embodiment, at step 46 of FIG. 3, at the end of the EMV transaction process, the response message generated by the mobile payment application 10 comprises also the transaction unpredictable number picked at step 45. At step 52, the server 12 extracts the user identifier from the response message. From this extracted user identifier the server 12 recovers the transaction unpredictable number used for this transaction from its database according to the pre-determined sequence way. The server 12 marks the recovered transaction unpredictable number as used in its database. The server 12 compares the transaction unpredictable number in the response message to the transaction unpredictable number recovered from its database. With this verification, the server 12 is able to identify if the authorization request is from a genuine mobile payment application 10 and a genuine secure element 15 or not. If the transaction unpredictable number is successfully verified, the server 12 then builds, at step 52, the EMV authorization request comprising the transaction cryptogram of the response message and wherein the recovered transaction unpredictable number is added. If on the other hand, the verification of the transaction unpredictable number fails, the process flow can be closed and the server may notify the mobile payment application that the transaction unpredictable number is tampered.

In another embodiment, at step 46, an index of the picked transaction may be added to the response message. Then, at step 52, the server 12 can recover the transaction unpredictable number used for this transaction from its database by index shown in the response message instead of using a pre-determined sequence way.

In another embodiment, at step 45, unused transaction unpredictable number is picked randomly instead of using a pre-determined sequence. In this case, to facilitate the recovery an index is associated to said picked unused transaction unpredictable number. At step 46 of FIG. 3, at the end of the EMV transaction process, the response message generated by the mobile payment application 10 comprises the associated index. At step 52, the server 12 extracts the user identifier from the response message. From this extracted user identifier and the associated index the server 12 recovers the transaction unpredictable number used for this transaction from its database. The server 12 builds, at step 52, the EMV authorization request comprising the transaction cryptogram of the response message and wherein the recovered transaction unpredictable number is added.

In another embodiment, at step 45, unused transaction unpredictable number associated to an index is picked randomly. At step 46 of FIG. 3, at the end of the EMV transaction process, the response message generated by the mobile payment application 10 comprises the transaction unpredictable number with its index. At step 52, the server 12 extracts the user identifier from the response message. From this extracted user identifier and the received index, the server 12 recovers the transaction unpredictable number used for this transaction from its database.

The server 12 compares the transaction unpredictable number in the response message to the transaction unpredictable number recovered from its database. If the transaction unpredictable number is successfully verified, the server 12 then builds, at step 52, the EMV authorization request comprising the transaction cryptogram of the response message and wherein the recovered transaction unpredictable number is added. If on the other hand, the verification of the transaction unpredictable number fails, the process flow can be closed and the server may notify the mobile payment application that the transaction unpredictable number is tampered.

In another embodiment, another simplex communication method can replace the image code encode, display, scan and decode processes from step 48 to step 50, for conveying response message of transaction from mobile payment application 10 to merchant 14 via user mobile device 11. The simplex communication method can be a modulated sound, a modulated vibration, a NFC tag message which are supported by the user mobile device.

The expression "transaction" can be taken in its broadest meaning. I.E. it cannot be limited to financial transaction, as herein described, but can also cover any transaction to access to a service of a service provider, any transaction occurring through a simplex communication.

The invention claimed is:

1. A method for authenticating a transaction involving a provider terminal, which is a terminal of a provider of a product or a service, and a mobile application of a user mobile device wherein:

during a registration process of the mobile application to an authentication server:
generating a set of transaction unpredictable numbers by an authentication server and sending the set of transaction unpredictable numbers from the authentication server to the mobile device,
receiving the set of transaction unpredictable numbers on the mobile device and storing the generated set of transaction unpredictable numbers on the mobile device, during an authentication of the transaction:
selecting by the mobile device, according to a pre-determined selection sequence, a transaction unpredictable number not marked as used from the stored set of transaction unpredictable numbers and to associating said selected transaction unpredictable number to said transaction,
computing a transaction authorization request cryptogram according to a standard transaction authentication algorithm from at least the selected transaction unpredictable number associated to the transaction, standard keys and a list of transaction data defined by the standard transaction authentication algorithm, and wherein a unique identifier of the user is added to the authorization request,
encoding the cryptogram into an image payment code, said image payment code being sent from the mobile application to the provider terminal for payment,
decoding by the provider terminal the received image payment code to recover information encoded in the image payment code including the transaction unpredictable number and sending the transaction unpredictable number to the authentication server for authentication,
extracting by the authentication server the unique identifier of the user added to the authorization request and to recover a transaction unpredictable number previously stored in the server database based on the extracted unique identifier of the user and the pre-determined sequence,
comparing by the authentication server the transaction unpredictable number of the decoded image payment code to a set of transaction unpredictable numbers previously stored in a database of the authentication server, if the comparison is successful, authenticating the transaction; and
sending by the authentication server to an issuer for authorization of the transaction the recovered transaction unpredictable number and the cryptogram of the authorization request, said issuer authorizing the transaction by verifying the content of the authorization request according to procedures defined in the standard transaction authentication algorithm by using the received recovered transaction unpredictable number, and wherein the terminal of a provider is notified by the issuer of a result indicating whether or not said transaction is authenticated and authorized.

2. The method according to claim 1, wherein during the authentication of the transaction unpredictable number the method comprises the following step:

from the decoded image payment code, the authentication server recovers a transaction unpredictable number from the set of transaction unpredictable numbers previously stored in the database of the authentication server, the recovered transaction unpredictable number is compared to the received selected transaction unpredictable number in the decoded cryptogram, and if the comparison is successful, adding the recovered transaction unpredictable number to the cryptogram and sending the cryptogram from the authentication server to an issuer for authorization of the transaction.

3. The method according to claim 1, wherein the image payment code is an image code such a QR code or a barcode, this image code being displayed on the user mobile device to be scanned by the provider terminal and sent by the provider terminal to the authentication server.

4. The method according to claim 1, wherein the image payment code is a modulated sound, a modulated vibration or an NFC tag message.

5. The method according to claim 2, wherein the unused transaction unpredictable number is selected according to a pre-determined sequence and wherein the step of operating the mobile application to compute a transaction authorization request cryptogram further comprises adding a unique identifier of the user and wherein the method further comprises operating the authentication server to recover the transaction unpredictable number from a database of transaction unpredictable numbers according to the unique identifier of the user and the pre-determined sequence.

6. The method according to claim 2, wherein unused transaction unpredictable numbers are each associated with an index and wherein the step of operating the mobile application to compute a transaction authorization request cryptogram further comprises adding the index associated to the selected transaction unpredictable number and wherein the method further comprises operating the authentication server to recover the transaction unpredictable number from a database of transaction unpredictable numbers according to the unique identifier of the user and the index associated to the selected transaction unpredictable number.

7. The method according to claim 6, wherein the unused transaction unpredictable number is selected randomly.

8. The method according to claim 1, wherein the transaction unpredictable number is marked as used in the storage after the selection step and the recovery step.

9. The method according to claim 1, wherein when the transaction unpredictable numbers stored in the mobile payment application are all marked as used then a new set of transaction unpredictable numbers is generated by the authentication server and sent to the mobile application for storage.

10. The method according to claim 1, wherein the transmission of the generated set of transaction unpredictable numbers from the authentication server to the mobile payment application is protected:
by applying an encryption algorithm which involves key(s) shared between the authentication server and the mobile payment application, and/or
by applying an integrity algorithm which involves key(s) shared between the authentication server and the mobile payment application.

11. The method according to claim 1, wherein the mobile application and the set of transaction unpredictable numbers are stored into a secure element of the mobile device.

12. The method according to claim 1, wherein the transaction is a financial transaction which being conform to EMV transaction standard, Mifare transaction standard or Calypso transaction standard.

13. The method according to claim 1, wherein the transaction authorization request cryptogram is generated from an amount of the transaction inputted by the user on the mobile device, the selected transaction unpredictable number, user financial data, various keys and data elements defined by the transaction standard.

14. The method according to claim 1, wherein the mobile device is a cellular or wireless phone, a tablet, a smartphone, a personal digital assistance (PDA), a pager, a portable computer.

* * * * *